(12) United States Patent
Yehoshua et al.

(10) Patent No.: US 8,131,594 B1
(45) Date of Patent: Mar. 6, 2012

(54) SYSTEM AND METHOD FOR FACILITATING TARGETED ADVERTISING

(75) Inventors: Tamar Yehoshua, Sunnyvale, CA (US);
Bharat Vijay, Bangalore (IN)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 11/520,945

(22) Filed: Sep. 14, 2006

Related U.S. Application Data

(63) Continuation-in-part of application No. 11/201,749, filed on Aug. 11, 2005.

(60) Provisional application No. 60/813,601, filed on Nov. 2, 2005.

(51) Int. Cl.
*G06Q 30/00* (2006.01)

(52) U.S. Cl. .................................... 705/14.53

(58) Field of Classification Search ............... 705/14; 707/3, 100; 709/224
See application file for complete search history.

(56) References Cited

U.S. PATENT DOCUMENTS 5,751,956 A    5/1998   Kirsch
(Continued)

OTHER PUBLICATIONS

"BlowSearch Launches Pay-Per-Click Search Engine Advertising Program; Company Introduces New Technologies in Effort to Compete with Google and Yahoo!," dated Mar. 30, 2005, <<http://www.naturalnews.com/003937.html>>, 2 pages.

(Continued)

*Primary Examiner* — John G. Weiss
*Assistant Examiner* — Saba Dagnew
(74) *Attorney, Agent, or Firm* — Lee & Hayes, PLLC

(57) ABSTRACT

A method of providing an advertisement including receiving a request for an advertisement of an advertiser, determining a purchase history for a user associated with the request for the advertisement, providing an advertisement of an advertiser in response to the request for the advertisement, and generating an advertising fee to be paid by the advertiser based on the purchase history of the user.

25 Claims, 7 Drawing Sheets

U.S. PATENT DOCUMENTS

| | | | |
|---|---|---|---|
| 6,055,573 A * | 4/2000 | Gardenswartz et al. | 709/224 |
| 6,078,866 A | 6/2000 | Buck et al. | |
| 6,189,030 B1 | 2/2001 | Kirsch et al. | |
| 6,269,361 B1 | 7/2001 | Davis et al. | |
| 6,571,279 B1 * | 5/2003 | Herz et al. | 709/217 |
| 6,631,372 B1 * | 10/2003 | Graham | 707/5 |
| 6,778,975 B1 | 8/2004 | Anick et al. | |
| 6,826,572 B2 | 11/2004 | Colace et al. | |
| 6,876,997 B1 | 4/2005 | Rorex et al. | |
| 6,907,566 B1 | 6/2005 | McElfresh et al. | |
| 6,954,736 B2 * | 10/2005 | Menninger et al. | 705/28 |
| 7,089,735 B1 | 8/2006 | Qiu et al. | |
| 7,225,182 B2 * | 5/2007 | Paine et al. | 707/3 |
| 7,734,502 B1 | 6/2010 | Yehoshua et al. | |
| 2001/0054001 A1 * | 12/2001 | Robinson | 705/14 |
| 2002/0004735 A1 | 1/2002 | Gross | |
| 2002/0072967 A1 * | 6/2002 | Jacobs et al. | 705/14 |
| 2002/0099605 A1 * | 7/2002 | Weitzman et al. | 705/14 |
| 2002/0107736 A1 * | 8/2002 | Mizuno et al. | 705/14 |
| 2002/0147634 A1 | 10/2002 | Jacoby et al. | |
| 2002/0169760 A1 | 11/2002 | Cheung et al. | |
| 2003/0033292 A1 | 2/2003 | Meisel et al. | |
| 2003/0046098 A1 * | 3/2003 | Kim | 705/1 |
| 2003/0046159 A1 | 3/2003 | Ebrahimi et al. | |
| 2003/0050863 A1 | 3/2003 | Radwin | |
| 2003/0056213 A1 | 3/2003 | McFaddin et al. | |
| 2003/0101126 A1 | 5/2003 | Cheung et al. | |
| 2003/0149937 A1 | 8/2003 | McElfresh et al. | |
| 2003/0149938 A1 | 8/2003 | McElfresh et al. | |
| 2003/0154126 A1 * | 8/2003 | Gehlot et al. | 705/14 |
| 2003/0220918 A1 | 11/2003 | Roy et al. | |
| 2003/0229542 A1 | 12/2003 | Morrisroe | |
| 2004/0015397 A1 | 1/2004 | Barry et al. | |
| 2004/0019523 A1 | 1/2004 | Barry et al. | |
| 2004/0039733 A1 | 2/2004 | Soulanille | |
| 2004/0044571 A1 | 3/2004 | Bronnimann et al. | |
| 2004/0103024 A1 | 5/2004 | Patel et al. | |
| 2004/0117259 A1 | 6/2004 | Morrisroe et al. | |
| 2004/0138956 A1 | 7/2004 | Main et al. | |
| 2004/0167845 A1 | 8/2004 | Corn et al. | |
| 2004/0186769 A1 | 9/2004 | Mangold et al. | |
| 2004/0204983 A1 | 10/2004 | Shen et al. | |
| 2004/0230491 A1 | 11/2004 | Messer et al. | |
| 2004/0249709 A1 | 12/2004 | Donovan et al. | |
| 2004/0260689 A1 | 12/2004 | Colace et al. | |
| 2005/0004835 A1 | 1/2005 | Roslansky et al. | |
| 2005/0021395 A1 | 1/2005 | Luu | |
| 2005/0027594 A1 | 2/2005 | Yasnovsky et al. | |
| 2005/0049915 A1 | 3/2005 | Mehta et al. | |
| 2005/0055269 A1 | 3/2005 | Roetter et al. | |
| 2005/0065844 A1 | 3/2005 | Raj et al. | |
| 2005/0071218 A1 | 3/2005 | Lin et al. | |
| 2005/0071224 A1 | 3/2005 | Fikes et al. | |
| 2005/0096979 A1 | 5/2005 | Koningstein | |
| 2005/0114366 A1 * | 5/2005 | Mathai et al. | 707/100 |
| 2005/0131758 A1 | 6/2005 | Desikan et al. | |
| 2005/0131762 A1 | 6/2005 | Bharat et al. | |
| 2005/0144069 A1 | 6/2005 | Wiseman et al. | |
| 2005/0144073 A1 | 6/2005 | Morrisroe et al. | |
| 2005/0216335 A1 | 9/2005 | Fikes et al. | |
| 2006/0136294 A1 * | 6/2006 | Linden et al. | 705/14 |
| 2007/0027765 A1 * | 2/2007 | Collins et al. | 705/14 |
| 2007/0027766 A1 * | 2/2007 | Collins et al. | 705/14 |
| 2007/0061195 A1 * | 3/2007 | Liu et al. | 705/14 |
| 2007/0124762 A1 | 5/2007 | Chickering et al. | |

OTHER PUBLICATIONS

Wall Street Journal article titled "In 'Click Fraud', Web Outfits Have a Costly Problem," by Kevin J. Delaney, dated Apr. 6, 2005., 5 page.
SearchEngineWatch.com article titled "Lost Per Click: Search Advertising & Click Fraud," by Jessie Stricchiola, dated Jul. 29, 2004, 4 pages.

* cited by examiner

SYSTEM AND METHOD FOR FACILITATING TARGETED ADVERTISING

CROSS-REFERENCE TO RELATED PATENT APPLICATIONS

This Application claims the benefit of priority under 35 U.S.C. §119(e) of U.S. Provisional Patent Application No. 60/813,601 entitled "System and Method for Facilitating Targeted Advertising" filed on Nov. 2, 2005 (which application was converted to a provisional patent application from U.S. patent application Ser. No. 11/265,768 filed on Nov. 2, 2005). This Application is further a Continuation-In-Part of U.S. patent application Ser. No. 11/201,749, entitled "Ad Server System with Click Fraud Protection," filed on Aug. 11, 2005. Both of the above-listed applications are incorporated herein by reference.

BACKGROUND OF THE INVENTION

A common advertising model utilized on the Internet, in particular with search engine websites, involves a system of providing sponsored links. Sponsored links are advertisements that appear in addition to search results when users input keywords at search engine websites. For example, if a visitor to the search engine website enters the term "flowers," advertisements that an advertiser believes may be relevant to someone searching for flowers are displayed with particular search results. Advertisers generally pay the provider of the search engine a fee for the display of the advertisements. The advertisements appear as a result of advertisers bidding on particular keywords, such as "flowers." If multiple advertisers place bids on the same keyword, it is common for advertisements with the highest bids to be displayed when a visitor enters a search term that matches the keyword. Oftentimes, there is no limit on the number of search terms a particular advertiser may bid on.

The bidding process is commonly managed by an intermediary, such as a search engine website. Advertisers bid on keywords and submit advertisements associated with the keywords to the intermediary. The intermediary typically utilizes one or more databases for storing the advertisements, associating the advertisements with bids and keywords, keeping track of the highest bidders, scheduling, etc., and ensuring that at any given instance the advertisements corresponding to the highest bids are displayed when search terms matching the keywords are entered by the visitors to the search engine website. Whenever a visitor clicks on a displayed advertisement, referred to herein as a "click event", the intermediary charges the advertiser a fee. The intermediary also commonly monitors the "click-through" rate (e.g., how many users actually select or click on the displayed advertisement). In some cases, if the number of visitors clicking on the advertisement is too low, the advertisement will no longer be displayed, even if it is associated with the highest bid.

Another variation of the above-described concept is to show the keyword-based advertisements on websites other than search engines' search result sites. For example, if a website contains information about flowers, then it is likely that visitors viewing the website may have an interest in advertisements related to flowers. Thus, the intermediary may provide special programs to which publishers of websites can subscribe. In such a program, the intermediary analyzes the publisher's website to determine a suitable keyword or set of keywords to be associated with the website, such as "flowers" in the above example. The intermediary selects from its database the highest bidder on the determined keyword or keywords and provides the appropriate advertisements for the publisher's website. This type of advertising program is beneficial to the publisher, since the publisher is not required to take action other than display the advertisements and collect monetary compensation for displaying the advertisements. The publisher may also receive monetary compensation each time a visitor of the website clicks on the displayed advertisement. This compensation model is often referred to as "pay per click."

An ongoing challenge is to ensure that advertisers receive adequate value for the money they spend on advertising. Some users may click on an advertisement but, if the user has never purchased a product over the web, the user is not a likely purchaser as a result of the advertisement. It would be beneficial to advertisers to be able to focus their advertising spending on users that are known to make purchases based on the advertisement displayed. It may further be beneficial to ad placement services to provide a system and method to capture the higher value of users who have previously made purchases. It should be understood that, although certain advantages are described, the teachings herein may be used to implement systems and methods that do not have any of these advantages but which have other advantages.

SUMMARY OF THE INVENTION

According to an exemplary embodiment, a method of providing an advertisement is shown. The method includes receiving a request for an advertisement of an advertiser, determining a purchase history for a user associated with the request for the advertisement, providing an advertisement of an advertiser in response to the request for the advertisement, and generating an advertising fee to be paid by the advertiser based on the purchase history of the user.

According to a second exemplary embodiment, a method of providing an advertisement is shown. The method includes receiving a selection of an advertisement of an advertiser, determining a purchase history for a user associated with the selection of the advertisement, and generating an advertising fee to be paid by the advertiser based on the purchase history of the user.

According to a third exemplary embodiment, a method of providing an advertisement is shown. The method includes obtaining one or more keywords associated with a user, receiving a purchase history for the user, and identifying one or more advertisements associated with the one or more keywords, each of the one or more advertisements advertising a product or service, and each of the plurality of advertisements being stored in a database. The method further includes selecting one of the one or more advertisements, providing the advertisement to the user, and determining an advertisement price to be charged to the advertiser for providing the advertisement to the user, the advertisement price being determined based at least in part on the purchase history of the user.

According to a fourth exemplary embodiment, an ad placement system for on-line advertising is shown. The ad placement system is configured to receive advertisements from advertisers, each advertisement having an associated bid indicative of a remuneration that an advertiser associated with the advertisement will compensate a website publisher for a specified response to the associated advertisement. The bid is generated based at least in part on a past purchase history correlating to the purchase history of a user. The system is further configured to aggregate the received advertisements in an on-line ad listing database that is accessible to website publishers via the Internet, receive advertisement selection information and user information from a publisher of a website, the user information including the purchase history of the user, select an advertisement from the ad listing database in accordance with the selection information, and provide the advertisement to the website publisher for display on the website of the website publisher to the user.

This summary and the following detailed description are directed to certain specific embodiments of the invention. The invention is not limited to the particular embodiments and applications described herein. The invention is defined only by the claims.

DETAILED DESCRIPTION OF THE PREFERRED EMBODIMENTS

Figure 1:
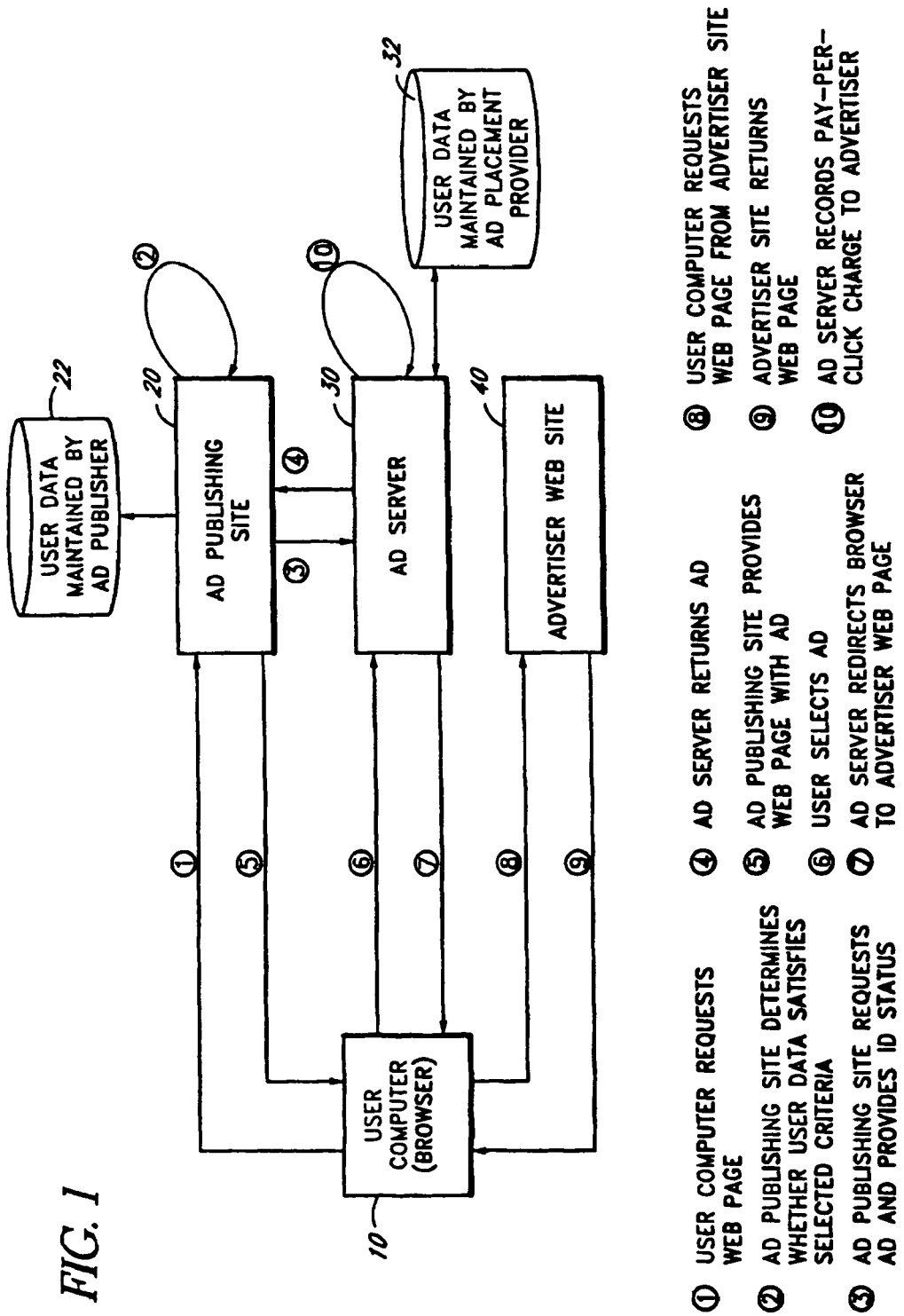
FIG. 1 is an illustration of the flow of information between a user computer, an ad publishing web site, an ad server, and an advertiser web site, according to one exemplary embodiment.

I. Overview (FIG. 1)

The present application provides an ad server system that takes into consideration information about the user who clicks on an ad in determining whether to charge the advertiser for the click event, and/or in determining an amount of a fee to charge the advertiser. By taking such user information into consideration, the system is capable of significantly reducing charges to the advertisers, and payments to ad publishers, for user actions that constitute click fraud. Further, such user information allows advertisers to provide their advertisements to a targeted audience to increase the effectiveness of the advertisement.

In one embodiment, unless a user who clicks on an ad is recognized, the advertiser is not charged for the ad selection event. Thus, advertisers do not have to pay the ad placement provider when the users who click on their ads are not recognized. If the user is recognized, the ad server system may determine whether and/or how much to charge the advertiser based on information about the recognized user. This information may include, for example, whether the user has set up an account, whether a valid credit card is on file for the user, whether the user has previously made purchases on-line and/or other types of user information that can be used to optimize advertising effectiveness for advertisers providing and paying for the advertisements.

The determination of whether and/or how much to charge the advertiser for an ad selection event may, in some embodiments, be based partially or entirely on user data maintained by the ad placement provider. For example, the ad placement provider (or on affiliate of the ad placement provider) may operate a web site, such as an online shopping site or a subscription-based content site, which provides functionality for users to create online accounts. The user data that is collected may include past purchase information. The past purchase information may be either limited, simply indicating that the user has or has not made an on-line purchase, or detailed, including detailed information regarding past purchases. Detailed information may include the item purchases, a general category for the item purchased, a geographic location associated with the item purchased, a vendor identification for the item purchased, method of payment, frequency of purchases, total dollars spent on-line, etc. The user data collected in connection with these user accounts may in turn be used by the ad server system to identify users who click on ads, and to determine whether these users meet pre-specified criteria for charging the advertiser. For example, the advertiser may be charged only if the ad server system receives a browser cookie from the user computer, or only if this cookie is associated with a user account that satisfies particular criteria.

The determination of whether and/or how much to charge the advertiser for an ad selection event may additionally or alternatively be based on user data maintained by the ad publishing site that published the ad. For example, the ad publishing site may maintain its own database of user account information in connection with services provided to customers of the ad publisher. The user account information may similarly include past purchase information related to the user. Upon receiving a browser request for a web page on which an ad is to be displayed, the ad publishing site may notify the ad server system of whether the user is recognized, and/or of whether the user meets pre-selected criteria (e.g., has a credit card on file, has made past purchases, etc.). If the user thereafter clicks on the ad, the ad server system may use the information received from the ad publishing site to determine whether and/or how much to charge the advertiser.

Referring to FIG. 1, a user computer 10, an ad publishing web site 20, an ad server 30, and an advertiser web site 40 that participate in ad selection transactions are shown, in accordance with one embodiment of the invention. Ad server 30 may be a component in an ad placement system 50, further described below with reference to FIG. 3, that provides functionality for collecting "sponsored link" type ads from advertisers, serving these ads for display on web pages, and charging advertisers for resulting ad selection events. The primary entity that operates the ad placement system 50 is referred to herein as the "ad placement provider."

Figure 2:
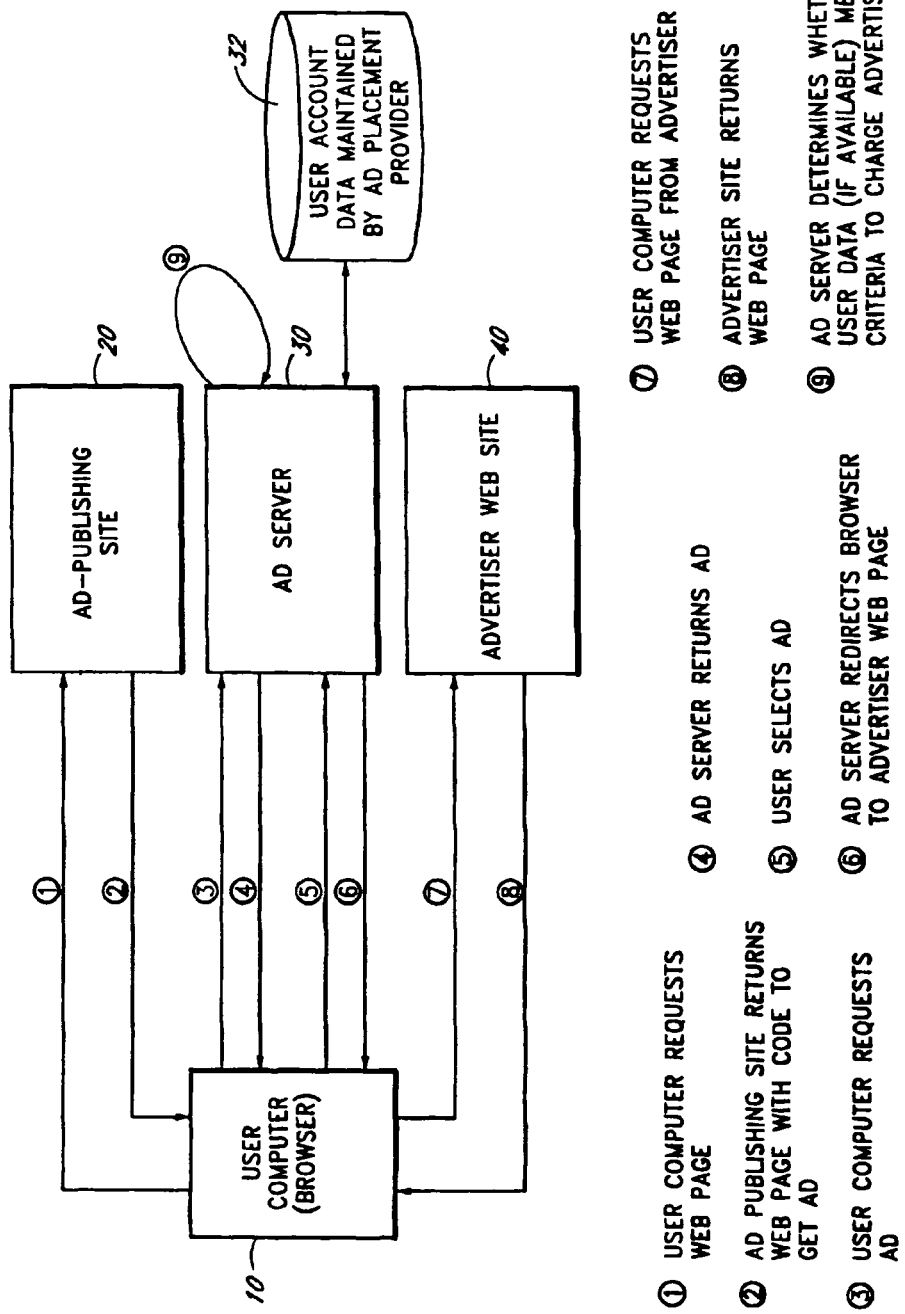
FIG. 2 is an illustration of the flow of information between a user computer, an ad publishing web site, an ad server, and an advertiser web site, according to a second exemplary embodiment.

The ad publishing site 20 may be one of many web sites that post or "publish" ads served by the ad server 30 through a business relationship with the ad placement provider. An entity that operates in ad publishing site 20 is referred to herein as an "ad publisher." In the embodiment depicted in FIG. 1, the ad publishing site 20 retrieves the ads from the ad server 30 in response to page requests from user computers 10, and incorporates these ads into the requested web pages. In another embodiment, which is depicted in FIG. 2 and discussed below, the ad server 30 transmits the ads directly to the user computers 10.

The advertiser web site 40 is a web site of an entity (referred to as the "advertiser") that advertises on one or more ad publishing site 20 via the ad placement system 50. As is known in the art, the advertiser may create one or more ads (also referred to as "sponsored links") via the ad generation interface of the ad placement system 50, and may specify one or more criteria for controlling how these ads are selected for display. For example, the advertiser may associate a given ad with one or more keywords that are used by the ad server 30 to select ads for display. Each such ad typically includes a link that can be clicked on to access the corresponding advertiser site 40.

The ad server 30, ad publishing site 20, and the advertiser site 40 may each be implemented by one or more physical servers. The user computer 10 may be any type of computing device (PC, personal digital assistant, television set-top box, mobile phone, etc.) capable of retrieving and displaying web pages or other types of hypertextual content. The various communications shown in FIG. 1 may occur over the Internet and/or any other type of computer network.

As depicted in FIG. 1, the ad server 30 may access a repository of user data 32, including user account data, for purposes of determining whether and/or how much to charge the advertiser for an ad selection event. For example, if a user who clicks on an ad is not recognized by the ad server 30, or is recognized but does not meet pre-specified criteria (e.g., has not set up an account, has not supplied a valid credit card number, has not made any past purchases, etc.), the ad server 30 may direct the user to the advertiser site 40 without charging the advertiser. User data to retrieve from this repository 32 may additionally or alternatively be used to calculate a monetary amount to be charged to the advertiser for the ad selection event.

The user data stored in the repository 32 may be collected as a result of other online operations of the ad placement provider and/or its affiliates. For example, the ad placement provider may operate one or more web sites for providing services (sales, rentals, subscription based content, etc.) to web users, or for conducting other types of operations that involve a collection of user data. The type of user data that is collected and stored by the ad placement provider, and used to determine pay-per-click charges to advertisers, may vary widely depending on the type or types of online transactions conducted. For example, in the context of online sales and rentals of items, the user data stored for a given user will typically include a user name and password, an e-mail address, a shipping address, credit card or other payment information, and a history of transactions conducted.

The determination of whether and/or how much to charge the advertiser may additionally or alternatively be made based on user data stored in a data repository 22 of the ad publisher. For example, the ad publishing site 20, and/or another web site of the ad publisher, may collect user data in the course of providing services (sales, rentals, subscriptions, etc.) to its customers. This data may be used alone, or in combination with user data maintained by the ad placement provider, to determine pay-per-click charges to the advertisers. Thus, although the ad server 30 and the ad publishing site 20 are both shown in FIG. 1 as accessing a respective repository 32, 22 of user data, one of these two repositories 32, 22 may be omitted.

In embodiments in which user data maintained by the ad publisher is used to determine pay-per-click charges to advertisers, the ad publishing site 20 may be configured to send cookie files ("cookies") to the computers 10 of some or all users that access the ad publishing site. When a user/browser submits a request to the ad publisher site 20 with a valid cookie, the user is said to be "recognized" by the ad publisher site. In some cases, a recognized user may be "unknown", meaning generally that the cookie is valid but is not associated with a valid user account. The users may additionally or alternatively be recognized via other types of automatically-transmitted identifiers that are now in use or which may be used in the future, including unique browser identifiers and unique CPU identifiers.

In embodiments in which user data maintained by the ad placement provider is used to determine pay-per-click charges to advertisers, one or more web sites of the ad placement provider may similarly store cookies on the computers 10 of users. These one or more web sites may operate in the same Internet domain as the ad server 30 so that the ad server 30 can access these cookies. As with the ad publishing site 20, a user may, in some cases, be recognized by, but unknown to, the ad server 30.

II. Process Flow with Ads Retrieved by Ad Publisher Site (FIG. 1)

The numbered events shown in FIG. 1 represent an exemplary embodiment in which the ad publishing site 20 retrieves the ads from the ad server 30 and incorporates these ads into web pages. A second embodiment, in which the ads are retrieved by the user computer 10, is depicted in FIG. 2 and described in section IV below. Although the events shown in FIG. 1 are numbered sequentially for purposes of explanation, the events do not necessarily need to be performed in the listed order. Further, the method may include additional, different and/or fewer events than those shown in the exemplary embodiment.

In event 1, the web browser running on the user computer 10 sends a page request to the ad publishing site 20. The page request may, for example, be an HTTP GET URL request, or may be an HTTP POST request used to submit a search query or other information supplied by the user. If a cookie corresponding to an ad publishing site 20 is stored on the computer 10, this cookie will ordinarily be transmitted with the page request.

As depicted by Event 2 in FIG. 1, if the page request is accompanied by a cookie, the ad publishing site 20 optionally determines whether the page request is associated with a user or user account that satisfies pre-selected criteria, such as a history of past purchases. This step may involve using the received cookie to look up associated user data from the ad publisher's data repository 22, and determining whether this user data satisfies one or more conditions. For example, the ad publishing site 30 may determine whether the received cookie is associated with a valid credit card or bank account, or whether the cookie is associated with an account that is otherwise in good standing.

In Event 3 in FIG. 1, the ad publishing site 20 sends a request to the ad server 30 for one or more ads to be displayed on the requested web page. This request may be accompanied with information about the outcome of the determination, if any, made by the ad publishing site in Event 2. For example, the ad publishing site 20 may notify the ad server 30 of whether the user meets one or more pre-specified criteria for charging advertisers for ad selection events, or may pass to the ad server user information (typically in anonymous form) for making this determination. Information about whether the user meets the pre-specified criteria may alternatively be communicated to the ad server 30 or ad placement provider at some later point in time, such as when the user clicks on the ad, or as part of a periodic batch transmission.

The request for the ad in Event 3 may also include information about the page request received from the user computer 10, such as the URL of the requested page, or if applicable, the search string supplied by the user. This information may be used by the ad server 30 to select one or more appropriate ads to return. The request in Event 3 may also include a unique transaction ID that can be used by both the ad publisher and the ad placement provider for tracking purposes.

In Event 4 of FIG. 1, the ad server 30 selects one or more appropriate ads, and returns the selected ads (typically in the form of HTML content) to the ad publishing site 20 for incorporation into the requested web page. (In some embodiments, the ad server 30 and/or the ad publishing site 20 may alternatively choose not to display any ads if the user is unrecognized). In selecting the ad or ads to be displayed, the ad server 30 may optionally take into consideration the outcome of the determination made in Event 2. For example, if the user was not recognized by the ad publishing site 20, the ad server 30 may, in some embodiments, only select ads for which the advertiser is charged for ad selections by unrecognized users. Thus, for example, the system of FIG. 1 may, but need not, be implemented such that the only users who are directed to a particular advertiser site 40 are those who meet the criteria for charging the advertiser.

The ad server 30 may, at the time of returning the ad in Event 4, determine and record the amount (which may be zero) that will be charged to the advertiser if the user subsequently clicks on the ad. Alternatively, this determination may be made at a later point in time, such as after the user clicks on the ad.

The ad or ads selected and returned in Event 4 may also depend upon the page request information, if any, passed to the ad server 30. For example, if the page request is in the form of a search query submission, the ad server 30 may select one or more ads associated with any keywords included in the search query. If the page request is a request for a relatively static web page of the ad publishing web site 20, the ad or ads may be selected based on the content of this web page as previously analyzed by a crawling program.

In Event 5 of FIG. 1, the ad publishing site 20 incorporates the ad or ads into the requested web page, and returns the web page to the user computer 10 for display. For purposes of illustration, it is assumed in this example that only a single ad is included in the web page, and that this ad corresponds to the advertiser web site 40.

In Event 6 of FIG. 1, the user selects the ad, such as by clicking on a link included in the ad, causing the web browser/user computer 10 to send a request to the ad server 30. This request may include an identifier of the advertisement, which may be used to look up the corresponding target URL of the advertiser web site 40. The target URL may alternatively be included in the request message itself. If the user computer 10 has previously accessed the web site of the ad placement provider, the request transmitted in Event 6 may also include a cookie associated with this web site.

In Event 7, the ad server logs a request (including any cookie received with the request), and responds by redirecting the user's web browser 10 to the advertisers site 40. In Events 8 and 9, the browser 10 responds to the redirect command by retrieving a web page from the advertisers site 40. In other embodiments, the ad may point directly to the advertiser site 40 such that a redirect is not necessary; in such embodiments, the web page may, for example, include JavaScript code that causes the browser 10 to notify the ad server 30 of the ad selection event.

In Event 10, which may alternatively occur before the web browser 10 is redirected to the advertiser site 40, the ad server 30 records the charge (if any) to the advertiser for the ad selection event. As mentioned above, the determination of whether/how much the advertiser will be charged for the ad selection event may be made either before or after the ad selection event occurs. This determination may be based solely on the outcome of Event 2, as reported by the ad publishing site 20. Additionally or alternatively, the ad server 30 may use a browser cookie received from the user computer 10 in Event 6, together with its own repository 32 of user data, to determine the amount the advertiser is to be charged. This may be accomplished by determining whether the user data associated with the cookie satisfies one or more pre-selected criteria, which may but need not be the same criteria used in Event 2.

The charge to the advertiser may be recorded in an accounting database 46 (FIG. 3) that is ultimately used to collect money from the advertisers, and to pay the corresponding ad publisher, for qualifying pay-per-click events. Although Event 10 is shown as being performed by the ad server 30, the determination of how much to charge the advertiser (and pay the ad publisher) may be made by a separate computer system using information collected by the ad server 30.

The process depicted in FIG. 1 may be implemented in a number of different ways so as to maximize advertising effectiveness and/or inhibit click fraud. For example, in one embodiment, the advertisers are only charged for ad selections made by users who are recognized and/or are recognized as having previously made on-line purchases by the ad publishing site 20 and/or the ad server 30. Because users that engage in click fraud are generally less likely to be recognized (e.g., because they commonly disable cookies when engaging click fraud), advertisers are less likely to be charged for fraudulent ad selection events. Because users that have previously made on-line purchases are more likely to do so in the future, the advertiser has increased their advertising effectiveness.

To further reduce click fraud and/or maximize advertising effectiveness, the process of FIG. 1 may be implemented such that the advertiser is charged only in accordance with the stored user data (if any) associated with the cookie that satisfies one or more selected criteria. For example, the advertiser may be charged only if user data stored by the ad publishing website 20 and/or the ad server 30 satisfies one or more of the following conditions: (a) a valid credit card is on file for the user; (b) the user has set up an account, and has linked this account to a bank account; (c) the user has supplied an e-mail address or telephone number that has been verified; (d) the user has engaged in a threshold number of financial transactions (purchases, rentals, etc.) in a selected period of time; (e) the domain name portion of the user's e-mail address reveals likely employment by an established organization. The foregoing are merely examples of the types of criteria that may be applied; other criteria that may be used will be apparent to those skilled in the art.

If multiple different types of user data are taken into consideration (such as those listed above), an identity score may be generated to quantify the degree to which the user is known or trusted. The identity score may be generated based on user data maintained by the ad publisher, user data maintained by the ad placement provider, other user data gathered independently, etc. The identity data may further be gathered based on some combination of the sources described above. Once generated, the identity score for user computer 10 may be compared to one or more thresholds to determine whether or how much the advertiser is to be charged.

Even if the user/user computer 10 satisfies the criteria for charging the advertiser, the charge to the advertiser may be blocked where the user has previously engaged in certain conduct, such as conduct reflective of click fraud. For example, the charge the advertiser may be blocked if either (1) the user has clicked on ads of this advertiser more than a threshold number of times (e.g. 10) within a selected time period (e.g. one-hour); or (2) the user has clicked on ads displayed on pages of this ad publishing web site 20 more than a threshold number of times during the selected time period. To implement this feature, the ad server 30 may keep track of the number of times each recognized user clicks on an ad of a particular advertiser, and the number of times each recognized user clicks on an ad on a particular ad publishing site 20. As another example, the advertiser may not be charged if the user has clicked on any ad of this advertiser in the preceding 24 hours.

The process of FIG. 1 may also be implemented such that the amount charged to the advertiser is generally proportional to the level or content of the information available about the recognized user. For example, the advertiser may be charged the full amount if the user has a valid credit card on file; may be charged a lesser amount (e.g. 50% of the full amount) if the user has set up an account that does not have a valid credit card on file, and may be discharged and even lesser amount (e.g. 10% of the full amount) if the recognized user has not set up an account. Although three user identification "tiers" are used in this example, any number of tiers may be used. For example, a number of tiers may be provided based on the total number or the total dollar amount of transactions in a users past purchase history.

Referring again to FIG. 1, in some cases, the advertiser may not actually operate its own web site 40, but may instead offer goods or services on a web site operated by the ad placement provider. In such a scenario, the user's web page may, instead of being redirected to an advertiser site 40, be redirected to an advertiser-specific web page hosted by the ad placement provider. The process may otherwise be the same as in FIG. 1.

III. Example Use Cases

The following examples illustrate some of the ways the system of FIG. 1 can be implemented. As a first example, suppose that the ad publishing site 20 is a subscription-based news site associated with a newspaper. Users wishing to access full-text news articles on this news site 20 must set up an account with a user name and password, and must supply either credit card information or bank account information for payment of a monthly subscription fee. A user account is treated as being in "good standing" if monthly subscription fees have been successfully charged to the user's credit card or withdrawn from the user's bank account for at least the preceding two months.

In this first example, the ad placement provider could offer advertisers an ad placement program in which their ads are contextually displayed on the story pages of the news site 20 on a pay-per-click basis, but in which the advertiser is charged only when the user computer 10 is recognized as being associated with an account that is in good standing. To implement this ad placement program, the news site 20 may be configured with software which determines, and notifies the ad server 30 of, whether a user computer 10 to which an ad is being served is associated with an account that is in good standing. The ad placement program could alternatively be implemented such that the advertiser pays a reduced fee (e.g., 75% off) if the "good standing" criteria is not met.

As a second example, suppose that the ad placement provider operates one or more e-commerce web sites for selling products, hosting online auctions, conducting other types of financial transactions, etc. In this example a user/user account may be treated as being in good standing if, for example, the user has conducted a financial transaction in the last three months, or if the user has conducted some threshold number or dollar amount of transactions since the inception of the account. As with the first example, the ad placement provider may refrain from charging the advertiser, or may give the advertiser a discount, if the user computer 10 that generates an ad selection event is not recognized as being associated with an account that is in good standing.

The system of FIG. 1 may also be used in connection with ads displayed on a web site operated by the ad placement provider. For example, suppose that the ad placement provider operates a web search engine site, and also offers various subscription-based services that require users to supply credit card information. In this third example, the ad service provider could display keyword-based ads in its web search results pages, in addition to or as an alternative to syndicating these ads for display on the sites 20 of third-party publishers. When a user clicks on an ad displayed on a web search results page, the charge to the advertiser may be contingent on whether the user is recognized by, and has a credit card on file with, the ad placement provider.

IV. Process Flow with Ads Retrieved by User Computer (FIG. 2)

FIG. 2 illustrates an alternative process flow in which the ad server 30 delivers the ads directly to users' web browsers. This method may be more appropriate for operators of relatively basic ad publishing web sites 20 since it does not require the creation or installation of any special software on the ad publishing site 20. The methods of FIGS. 1 and 2 can both be used within a given ad placement system 50, with different methods being used for different ad publishing sites 20.

In the particular example shown in FIG. 2, the determination of the pay-per-click charge to the advertiser is based solely on user data maintained by the ad placement provider. As discussed below, the method of FIG. 2 can be augmented or modified to take user data maintained by the ad publisher or some other source into consideration.

Referring to FIG. 2, the user computer 10 initially requests a web page from the ad publishing site 20 (Event 1). Instead of retrieving an ad from the ad server 30 as in the embodiment of FIG. 1, the ad publishing site 20 responds with a web page (Event 2) that directs the browser running on user computer 10 to request one or more ads (Event 3). For example, the web page may include a code element, such as a URL, a JavaScript sequence, and/or an HTML sequence, which causes the browser to send an ad request message to the ad server 30. The ad publisher may add this code element to those web pages that are to display ads. The ad request message in Event 3 may include information, such as one or more keywords or an identifier of the retrieved web page, that are used by the ad server 30 to select one or more ads to be displayed. The ad server 30 may also use a cookie retrieved with the ad request to personalize a selection of the ad(s) for this particular user. The selected ad or ads are returned in Event 4, and displayed in a designated area of the web page. For purposes of illustration, it is assumed in this example that only a single ad is displayed.

Events 5-8 in FIG. 2 are generally identical to Events 6-9 of FIG. 1. Specifically, upon clicking on the ad, the ad server 30 records the ad selection event (including the received cookie, if any) and redirects the browser 10 to the advertiser web site 40 (or alternatively, to a web site associated with the advertiser but hosted on another entity's web site). Finally, in Event 9, which may be identical to Event 10 of FIG. 1, the ad server 30 determines whether the advertiser should be charged for the ad selection event, and/or determines the amount of the charge. This step may involve using a cookie received in Event 3 or Event 5 to retrieve user data stored in the repository 32, and determining whether this user data satisfies one or more criteria. As in the process flow of FIG. 1, the determination of whether/how much the advertiser will be charged for the ad selection event may be made when the ad is served (Event 4), but may be contingent upon the user subsequently clicking on the ad.

As mentioned above, the method shown in FIG. 2 may be modified to take into consideration user data maintained by the ad publisher site 20. This may be accomplished by having the ad publishing site 20 encode information in the ad request coding of the web page delivered in Event 2. This encoded information may, for example, indicate whether the user was recognized, whether ad publishing site 20 has a credit card on file for this user, etc. When the web browser 10 requests the ad in Event 5, this encoded information would be passed to the ad server 10, such that this information may be taken into consideration in determining the pay-per-click fee to the advertiser.

V. Detecting Fraudulent Conduct by Ad Publishers

In embodiments which rely on user data maintained by the ad publisher, the ad publishing site 20 can potentially be fraudulently configured to pass erroneous information to the ad server 30 to the benefit of the ad publisher. For example, the ad publisher could potentially set up its site 20 to treat unrecognized users as recognized, or to treat users who failed to satisfy certain criteria as satisfying such criteria. To protect against this form of fraud, the ad placement provider can conduct periodic ad selection transactions or "test clicks" that do not satisfy the criteria for charging the advertiser. As these transactions are conducted, the user information reported by the ad publishing site 20 to the ad server 30 can be monitored to ensure that the transaction is not mischaracterized.

For instance, suppose that the pay-per-click arrangement specifies that the advertiser will not be charged, and the ad publisher will not be paid, for a transaction in which the user does not have a valid credit card on file with at least one of the ad publisher and the ad placement provider. To test for fraudulent ad publisher activity, the ad placement provider can create any number of "dummy" user accounts on the ad publishing site 20 without supplying any credit card information, and can use these accounts to select ads on pages of the ad publishing site 20. If the ad publishing site 20 erroneously reports that these transactions qualify for pay-per-click payments, the ad placement provider can infer that the ad publisher is engaging in fraudulent activity.

This process of verifying that the ad publishing site is reporting accurate information can be automated via software. For example, a set of agent computers can be programmed to set up accounts on various ad publisher sites 20, to periodically click on ads of these sites, and to report these ad selection events to the ad server 30 for purposes of verification.

VI. Post-Ad-Selection Recognition of User

In some cases, a user may not satisfy the criteria for charging the advertiser at the time the ad is selected, but may satisfy the criteria shortly thereafter. For instance, the user may, at the time of selecting an ad, not yet have an account with either the ad publisher or the ad placement provider. Shortly thereafter, the user may set up an account on the ad publisher site 20 and/or a web site of the ad placement provider, and thus meet the criteria for charging the advertiser. Because the user very likely is not engaging in click fraud in this scenario, the advertiser may, in some embodiments, be charged for the ad selection event even though the user/user computer 10 did not satisfy the criteria at the time of the ad selection event.

To implement this feature, the ad publishing site 20 and/or the ad server 30 may be programmed to write a cookie to the unrecognized user computer 10 during the sequence of interactions shown in FIGS. 1 and 2, such that the user can thereafter be identified by one or both sites as a returning user. If the user returns within a specified time period (e.g., within 24 hours of the ad selection event) and sets up an account, the prior ad selection transaction may be treated as satisfying the criteria for charging the advertiser.

VII. Example System Architecture and Ad Generation UI (FIGS. 3 and 4)

Figure 3:
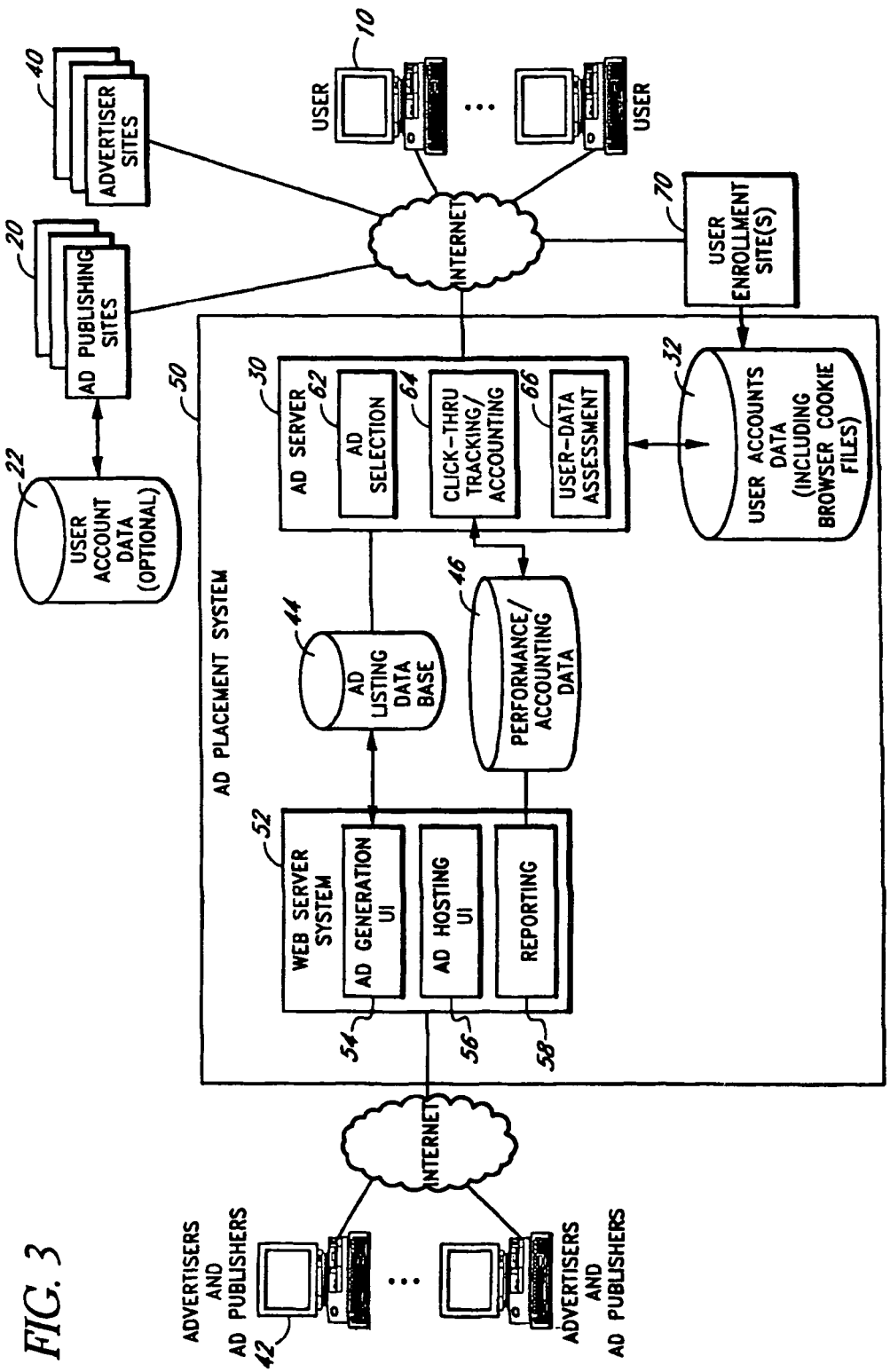
FIG. 3 is an illustration of an ad placement system illustrating how the ad placement system interacts with other computer systems, according to an exemplary embodiment.
Figure 4:
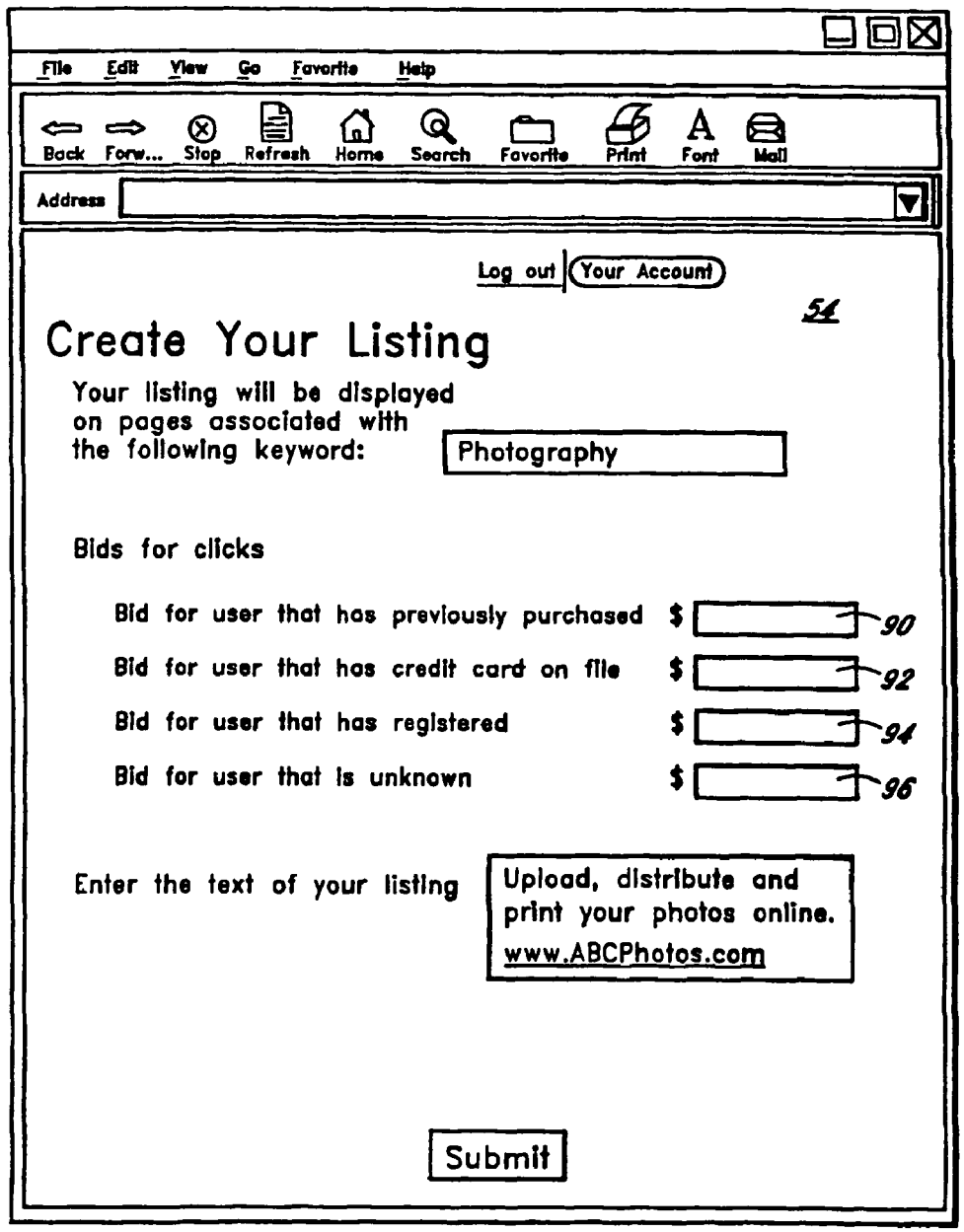
FIG. 4 is an illustration of a web-based interface that allows an advertiser to place different bids for different classes of users, according to an exemplary embodiment.

FIG. 3 illustrates an ad placement system 50, and associated components, that may be used to implement the methods of FIGS. 1 and 2. The ad placement system 50 includes a web server system 52 that provides a user interface for managing online advertising. The web server system 52 includes an ad generation user interface 34, an ad hosting user interface 56, and reporting user interface 58, each of which may be implemented as a set of web page templates and associated code modules.

The ad generation interface 54 provides functionality for advertisers to create sponsored-link type ad listings, and to specify parameters for controlling the placement of such listings. The parameters specified for particular ad listings may, for example, include one or more keywords, keyword phrases, topics, URLs, and/or other types of elements used to match ads to web pages. The ad listings are maintained in an ad listing database 44 that is accessed by the ad server 30. Advertisers may access the ad generation interface 54 over a network, such as the Internet, via computers 42 that run web browser software.

The ad generation interface may, in some embodiments, provide an option for the advertiser to specify different bid amounts for different classes of users (e.g. recognized, unrecognized, account holder, customer with credit card, etc.). With this approach, when a user falling in one of the designated user classes clicks on the ad, the fee charged to the advertiser may be equal to, or determined based on, the corresponding bid amount. The bid amounts may also be used to rank ads for display relative to ads from other advertisers.

FIG. 4 illustrates one example of a web page that provides such an option to supply different bids for different classes of users. In this example, input field 90 allows the advertiser to bid on ad placements that result in a click by a user that is known to have previously made a purchase. Similarly, input fields 92, 94 and 96 allow the advertiser to bid on ad placements that result in a click by a user that has a credit card on file, has registered, and is unknown, respectively. The bidding interface shown in FIG. 4, can be varied in numerous ways, such as by allowing the advertiser to distinguish between user data maintained by the ad publisher and user data maintained by the ad placement provider, or by allowing the advertiser to bid on a range of values of an identity score. Alternatively, a column in the bidding interface may include a premium selection field where an advertiser may choose to automatically pay a premium value amount where a user having a past purchasing history is available. For example, a header to the premium selection field may indicate that a premium of 10% over the entered bid in input field 90 will be charged to the advertiser if the advertisement is displayed to user having a past purchasing history and the user puts a check mark in the premium selection field.

Rather than specifying multiple bid amounts as in FIG. 4, the advertiser may be prompted to specify a single bid amount per ad or per ad-keyword combination. This bid amount may control the fee charged to the advertiser for ad selections by users meeting one or more published criteria. Additionally, the advertisers may be informed that higher bids will automatically be allocated to users having the past purchase history. Accordingly, those advertisers that bid the higher amounts will be provided access to those users that are more likely to make purchases based on the advertisement. The advertiser may also be informed that ad selections by all other users are free to the advertiser.

VIII. Facilitating Targeted Advertising Based on Past Purchases (FIGS. 5 and 6)

Figure 5:
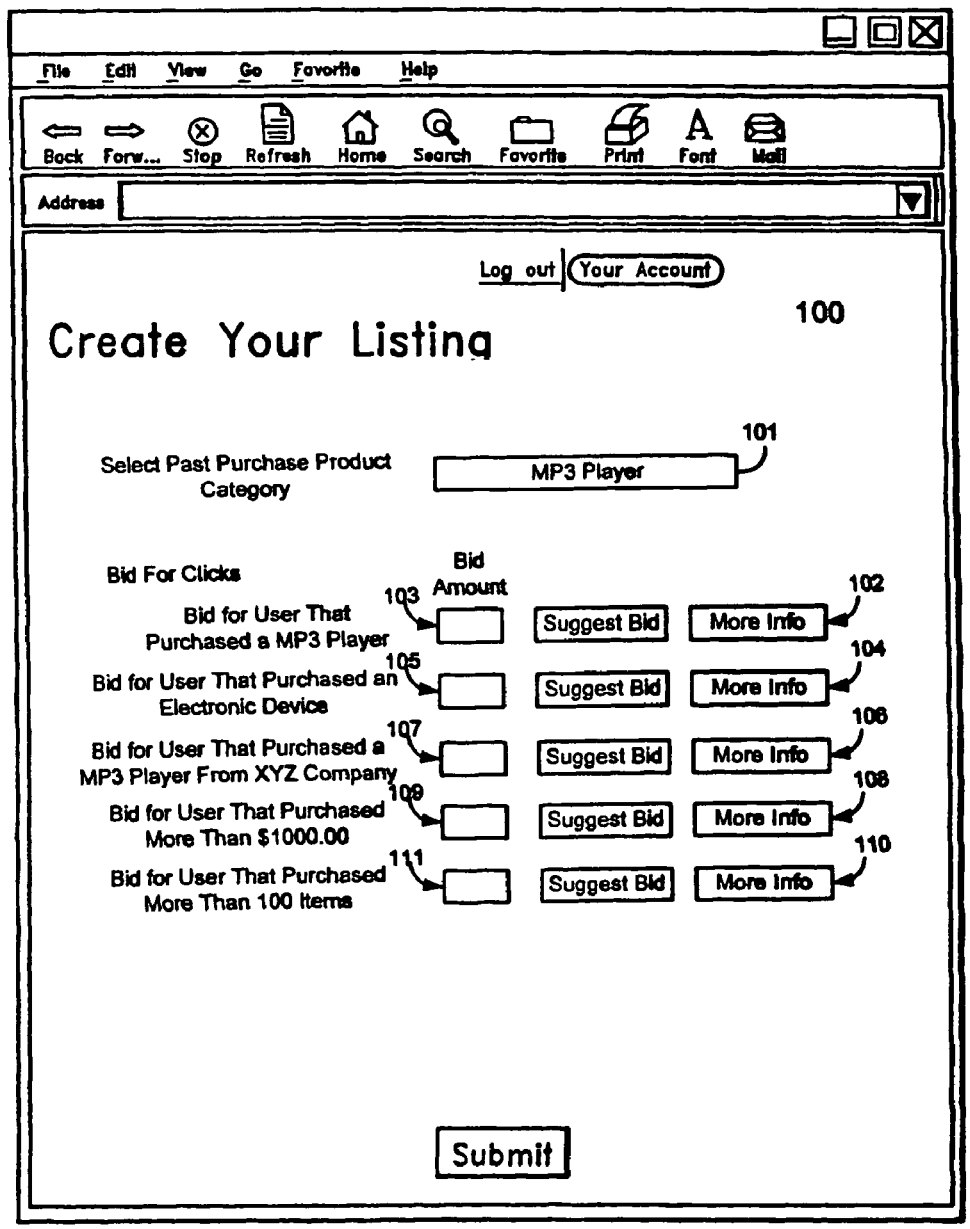
FIG. 5 is an illustration of a web-based interface that allows an advertiser to place different bids for different classes of users, according to an exemplary embodiment.
Figure 6:
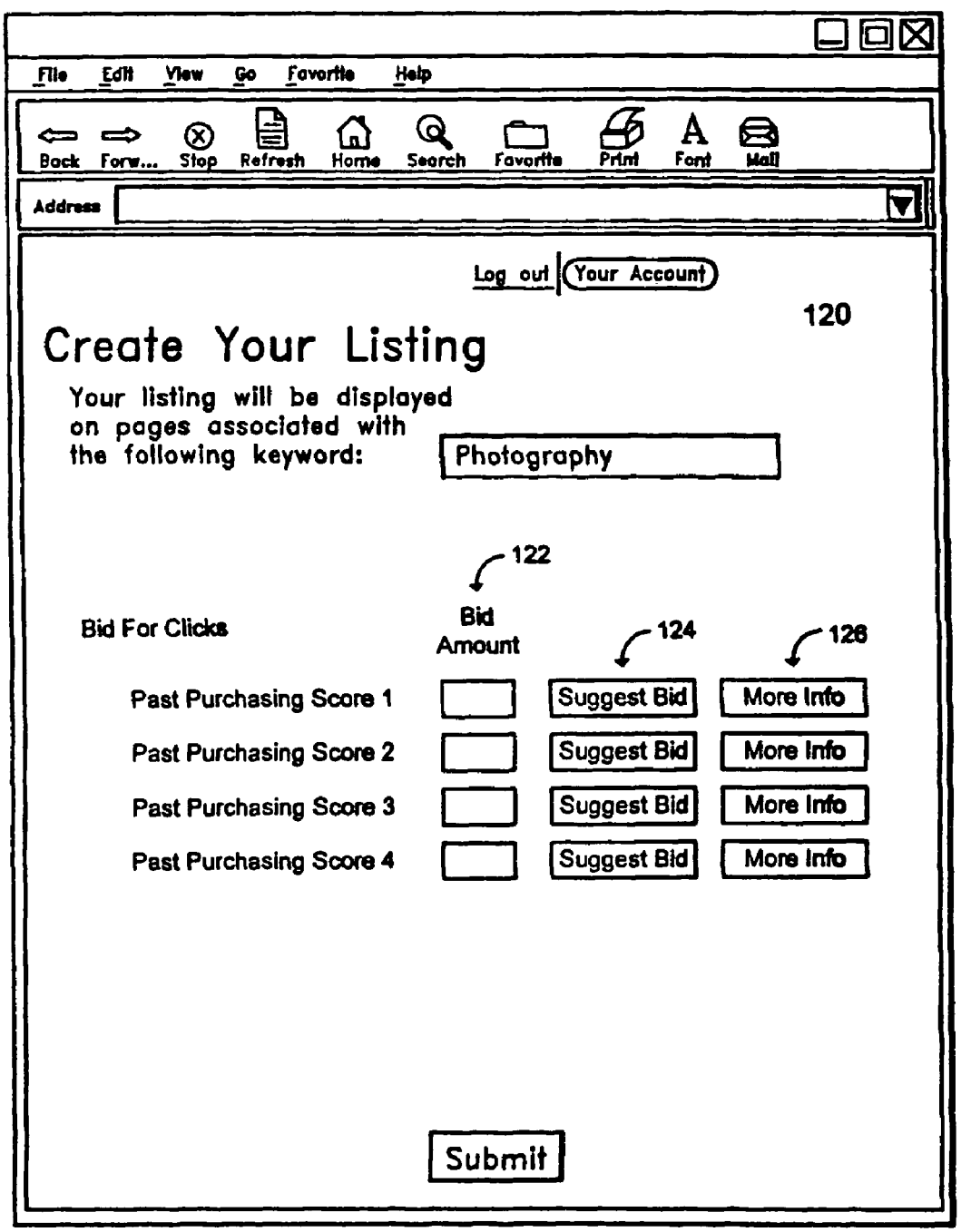
FIG. 6 is an illustration of a bidding interface that is configured to allow an advertiser to bid on different tiers of past purchasing scores, according to an exemplary embodiment.

Referring now to FIG. 5, FIG. 5 is an illustration of a web-based interface 100 that allows an advertiser to place different bids for different classes of users, where the user classes are differentiated by parameters associated with the users past purchasing history. Interface 100 includes a product type selection input field 101 configured to allow an advertiser to select from a predetermined listing of possible product categories. Each product type may be associated with a set of parameter listings associated with the product type. For example, where an advertiser has selected a product type of MP3 players, as shown in FIG. 5, interface 100 includes a first parameter listing 102 which includes a field 103 to enter a bid for a user that has previously purchased an MP3 player, a second parameter listing 104 which includes a field 105 to enter a bid for a user that has previously purchased an electronic device, a third parameter listing 106 which includes a field 107 to enter a bid for a user that has made previously made a purchase from a specific manufacturer of MP3 players, a fourth parameter listing 108 which includes a field 109 to enter a bid for a user that has made more than $1000.00 in online purchases, and a fifth parameter listing 110 which includes a field 111 to enter a bid for a user that has made more than 100 total purchases on line.

Each of the parameter listings 102-110 may be configured to allow advertisers to make their bids based on a parameter that is associated with users that are particularly valuable to an advertiser. For example, an indication that a user has previously made an online purchase may be a significant indicator of whether the purchaser is more likely to make an online purchase in the future. Accordingly, an advertiser may bid a larger amount for a user that has previous made an online purchase. Similarly, a user who has previously purchased an item from a specific category would be more likely to purchase from an advertiser offering accessories for items within that category. For example, a user that had recently purchased an MP3 player would be more likely to make a subsequent purchase from an advertiser offering MP3 player accessories such as headphones, carrying cases, memory cards, etc. Advantageously, submitting bids based on the parameter of interest allows an advertiser to implement more targeted advertising. Providing multiple input fields allows an advertiser to enter multiple bid amounts according to the differing value an advertiser associates with each parameter listing.

Although exemplary parameter listings are shown and described above with reference to interface 100, it should be understood that other parameter listings may be provided which include fields for bidding on other types of parameters. The parameters may include different parameter listing types, different amounts associated with each parameter listing, etc. Exemplary additional parameters may relate to a geographic location associated with past purchases for the user, the frequency of past purchases for the user, the timing of past purchases for the user, etc.

According to an alternative embodiment, each of the parameter listings shown in FIG. 5 may include additional input fields configured to receive parameter detail or threshold information associated with the listing. For example, third parameter listing 106 may further include an input field configured to receive an identification of the specific manufacturer of MP3 players and fourth parameter listing 108 may further include an input field configured to receive the dollar amount threshold associated with the online purchases.

Referring now to FIG. 6, an illustration of a web-based bidding interface 120 that is configured to allow an advertiser to bid on different tiers of past purchasing scores is shown, according to an exemplary embodiment. A past purchasing score may be a numeric value indicative of a likelihood that the user will complete an online purchase based at least in part on the user's historical purchasing behavior. Permitting the advertiser to submit a bid based on a past purchasing score provides a convenient way for the advertiser to submit a bid based on many potential parameters at once, rather than submitting a bid based on each of the parameters individually.

Ad placement system 50 may be configured to generate the past purchasing score. The past purchasing score may be generated based on any of a variety of factors such as those associated with parameter listings 102-110, describe above with reference to FIG. 5.

The past purchasing score may be enhanced with information that is not necessarily associated with past purchasing behavior, but may be an indicator of future purchasing behavior. Exemplary enhancing factors may include information associated with the user such as a user's employer, a user's home ZIP code, a user's age, a user's sex, etc. The enhancement factors may be any type of information indicative of the likelihood that a user will execute a particular online purchase at present or in the future.

A past purchasing score may also be enhanced by tailoring the score to the identity of the advertiser that is currently accessing the bidding interface 80. For example, a past purchasing score, i.e., the likelihood that a purchaser will complete an online purchase, may change depending on the type of goods or services offered for sale by the advertiser. For example, a user who has previously purchased an MP3 player may have a higher past purchasing score when the user is displayed an advertisement from an advertiser of MP3 player accessories compared to when the user is displayed an advertisement from an advertiser of insurance products.

The past purchasing score may be further enhanced based on a projected value to an advertiser. The projected value may be determined based on the identity of the advertiser, the nature of the advertisement, the nature of the ad publishing site 20, etc. The projected value may be calculated to indicate a likely value to the advertiser of a winning bid for users having a particular past purchasing score. The projected value may, for example, be dependent on the type of business of the advertiser. For example, a projected value for a high end jeweler may be different from the projected value for an advertiser of novelty goods. The high-end jeweler may have a higher incidence of purchases where user is a past purchaser or may be able to generate more revenue from every completed online transaction.

Bidding interface 120 may be configured to include a plurality of input fields 122 which are each associated with a different tier of past purchasing score. Although only four tiers are shown according to this exemplary embodiment, alternative embodiments may include as many tiers as desired.

According to an alternative embodiment, a past purchasing score may be bid upon in the form of a range instead of discrete threshold values. For example, a past purchasing score may be a value between 1 to 100. An advertiser may provide a base bid amount and indicate a past purchasing premium range that the advertiser is willing to pay based on the past purchasing score. For example, an advertiser may provide a base bid amount of 10 cents and a past purchasing premium of up to an additional 10 cents based on the past purchasing score. The past purchasing score may be multiplied by the past purchasing premium to determine the fee that is due based on the user's past purchasing history. Accordingly, if an advertisement for the advertiser providing the bid and range described above is displayed to a user having a past purchasing score of 50 out of 100, the advertiser pays the 10 cent base fee and a 5 cent premium fee based on the user's purchasing history.

According to an exemplary embodiment, past purchasing premium selection may also be provided as an option in connection with a standard keyword bidding interface. That is, an advertiser submitting a standard keyword bid may further be presented with an option to provide a past purchasing premium range. Accordingly, a single bidding interface can be used to implement keyword bidding with or without past purchasing premium ranges, making the bidding process easier for the advertiser.

Bidding interface 120 may further include a "suggested bid" button in a column 124 that will automatically populate input fields associated with the various past purchasing scores in column 122. A suggested bid may be calculated based on a combination of the past purchasing score and historical data indicating the amount of bids that have previously been required for a given past purchasing score. Alternatively, a suggested bid may be displayed automatically upon access of bidding interface 120. According to further alternative embodiments, the suggested bid button in column 124 may be replaced with a data field which conveys to the advertiser the premium value of a user having a past purchasing history. For example, column 124 may include a value indicating a premium that an advertiser should expect to pay for a user having a past purchasing history at each particular tier.

Bidding interface 120 may further be configured to include a "detailed information" button for each past purchasing score in a column 126. Each detailed information button, when clicked, may cause a pop-up window to appear showing attributes, statistics, or other information associated with any particular past purchasing score. For example, a pop-up window may display the type of users that will be presented with the advertisement if the advertiser submits a winning bid.

Figure 7:
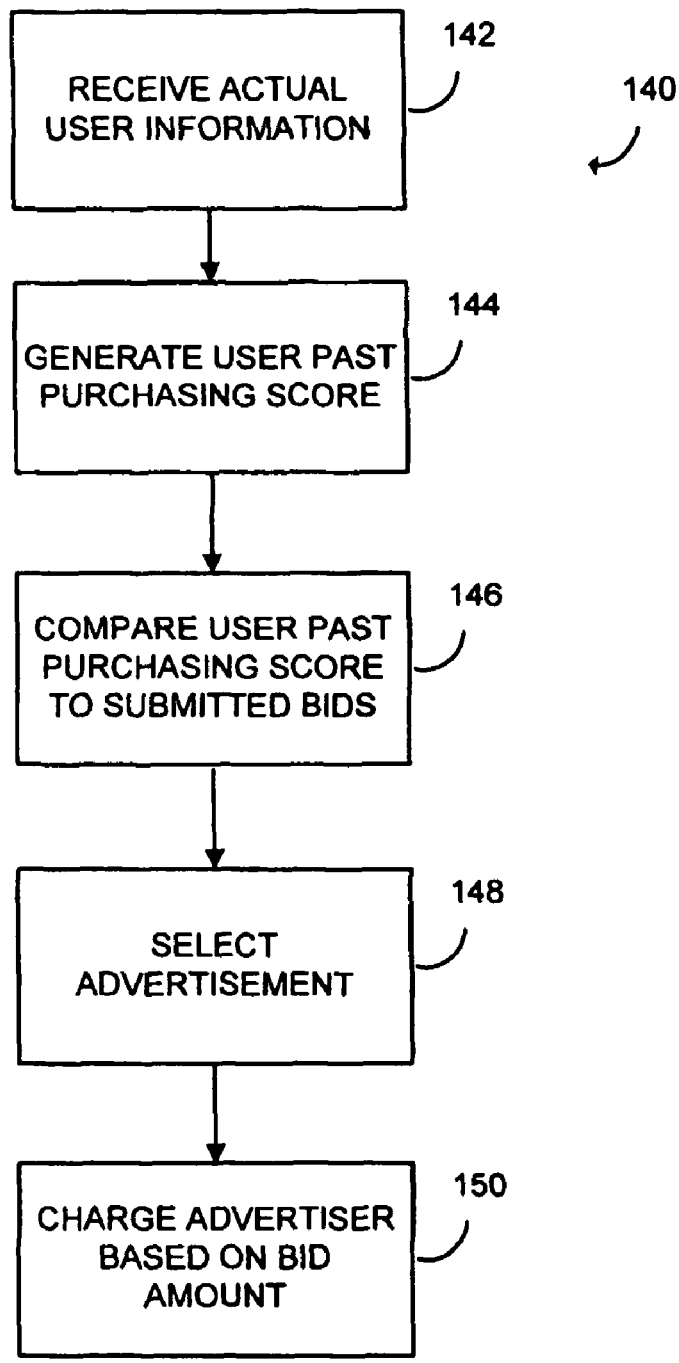
FIG. 7 is a flowchart illustrating a method of providing an advertisement based on an advertiser bid that was submitted based at least in part on a past purchasing score, according to an exemplary embodiment.

Referring now to FIG. 7, a flowchart 140 illustrating a method of providing an advertisement based on an advertiser bid that was submitted based at least in part on a past purchasing score is shown, according to an exemplary embodiment. The method may be implemented by ad placement system 50.

In a step 142, actual user information is received by ad placement system 50. The user information includes information about an actual user visiting an ad publishing site 20. Accordingly, the user information may be associated with a request for an advertisement to be displayed to the user by ad publishing site 20. The user information may be received from an ad publishing site 20 in conjunction with the request for an advertisement to be displayed to the user. Alternatively, the user information may be received internally from user accounts repository 32 or web server system 52. Further, the user information may be gathered and/or augmented from any other source, such as identification of the user's IP address, identification of the user's computer, identification of the user's email address, publicly available information, etc.

After receiving the information, ad placement system 50 may be configured to generate a past purchasing score for the particular user in a step 144. The past purchasing score may be generated based on any one or more of the factors described above. Where the user's past purchasing history cannot be determined, the user may be treated as unrecognized or as having no past purchasing history. The past purchasing history may be further augmented by any available additional information regarding the user's past purchasing history. The additional information may include any of a wide variety of information similar to the information used to calculate the past purchasing scores as described above with reference to FIG. 6.

The user's past purchasing score may be compared to the past purchasing score tiers in a step 146. In comparing the user's past purchasing score or to the past purchasing score tiers, ad placement system 50 can determine the advertisers that have placed a bid for a user matching the user's information and the advertiser's corresponding bid amounts.

Ad placement system 50 may be configured to select the advertisement of the advertiser that will produce the best result (e.g., maximum revenue) in a step 148. The advertiser that made the highest bid may not be the advertiser will produce the best result. The best result may be determined based on the bid amount as well as additional factors such as the likelihood that the user will actually click on the ad, the quality of the advertisement, etc.

Following display of the advertisement, ad placement system 50 may be configured to determine an advertising fee that is payable by the advertiser where the advertising fee is based in part on the advertiser's bid amount, in a step 150. Given that the fee is based on the bid amount, and the bid amount is based on the past purchase history of the user, the fee charged to the advertiser is based on the past purchase history of the user. The fee may be further based on any of a variety of factors, such as whether the user actually clicked on the ad, whether a transaction occurred, etc.

Although the above described steps are described as being performed in a certain order by a single entity, it should be understood that the method may include more, less, and/or a different ordering of the steps and be performed by any number of entities. Further, although the above method describes using the received user information in the context of the past purchasing scores of FIG. 6, it should be understood that the received information may also be used in the context of the parameter listings of FIG. 5 and/or the input fields of FIG. 4. Further, the system may be configured to determine the past purchasing score using any of a variety of factors and/or methods.

Although three types of bidding interface are shown, the bidding interface may be varied in any of a variety of ways, such as by allowing an advertiser to distinguish between user data maintained by the ad publisher and user data maintained by the ad placement provider. Other alternative embodiments may include allowing an advertiser to bid according to the specific keywords, bid according to the user's location, etc.

Referring again to FIG. 3, the ad hosting interface 56 provides functionality for a web site operator to enroll as an ad hosting entity or "publisher," and to configure one or more of its web pages to enable ads to be displayed thereon. The publisher can generate revenue by publishing ads together with content such as news, product reviews, tutorials, educational information, or message boards. If the publisher operates an Internet search engine site, the ads may be displayed on search results pages, and may be selected based on search criteria entered by users. The ad hosting interface 56 may provide various options for the publishers to control the types of ads that are displayed on their respective web sites 20. An application programming interface (API) for communicating with the ad server 30 may be made available to the ad publishers for purposes of implementing the method of FIG. 1.

The reporting interface 58 provides functionality for reporting the results of ad campaigns. Advertisers may access this interface 58 to evaluate the respective ad campaigns, and ad publishers may use the interface 58 to evaluate the respective ad publishing strategies. For example, reporting interface 58 may be configured to display the number of users that clicked on the advertiser's advertisements that actually made a purchase. The current purchase information for users that clicked on an advertiser's advertisements may be compared to the past purchase information associated with the users to illustrate advantages associated with users having past purchase information. For example, such information may be used to perform a cost-benefit analysis of submitting higher bids of users with certain past purchase history characteristics versus submitting lower bids for all users (with or without past purchase histories). Advantageously, reporting interface 58 may be used to illustrate the benefit derived by the advertisers of targeting users having a past purchasing history.

The data used by the reporting interface 58 may be maintained in a performance/accounting database 46. This information may be obtained based on purchases made from web publishers, advertisers, public information, gathered information, etc.

The ad server 30 shown in FIG. 3 may operate according to the method of FIG. 1 and/or the method of FIG. 2. The ad server 30 includes an ad selection program module 62 which dynamically selects ads to display on the web pages of ad publishing sites 20, as described above. In addition, the ad server 30 includes a click-through tracking/accounting program module 64 that is responsible for processing ad selection events, and for recording resulting charges in the performance/accounting database 46.

The ad server 30 also includes a user-data assessment program module 66 that is responsible for analyzing user data retrieved from the ad placement provider's user accounts repository 32. As illustrated, this repository 32 is populated with account data collected by one or more user enrollment web sites 70, such as an online sales site, a DVD rental site, a subscription-based news site, or a social networking site. These user enrollment sites 70 may be operated by the ad placement provider, or by a partner or affiliate of the ad placement provider. The criteria applied by user-data assessment module 66 to determine whether and/or how much to charge advertisers for ad selection events can vary from one advertiser to another and/or from one ad publisher to another.

The web server system 52 and the ad server 30 may each be implemented using one or more (and typically many) physical servers. The repository in 22, 32, 44, and 46, depicted in FIG. 3, can be implemented using relational databases, flat files, and/or other types of data repositories.

Here and throughout, terms such as "user," "advertiser," "publisher," and so forth are to be understood in the broadest possible sense. By way of illustration and not of limitation, an "advertiser" may be an individual or a commercial, government, or non-profit entity; may be directly responsible for placing an advertisement, announcement, message, or the like, or may be a broker, reseller, or intermediary for another's advertisements, announcements, messages, or the like; may be advertising for its own products and services or may be advertising on behalf of another; may be represented by a human agent or by a web service, software agent, or other programmatic construct, etc. Likewise, a "publisher" is not restricted to persons or entities who purport to be in the on-line publishing business (or any other kind of publishing business), nor to entities who have complete or even primary control over the content of particular websites; but rather is used in a more general sense. In the context of Internet-based advertising, for example, "publisher" includes any person or entity responsible directly or indirectly for putting content on the Internet, whether by hosting or sponsoring websites, posting pages, frames, graphics, applets, blogs, audiovisual content, etc., on their own or others' websites, providing web services that can source content for websites, or in any other manner. Still further, a "user" may be an individual who visits and views or otherwise perceives the content of a web site and pages therein via a web browser or other client software program running on a personal computer, wireless handheld device, or the like, but may also be, for example, a corporate or other entity whose servers access published web content and advertisements by invoking web services through appropriate application programming interfaces (APIs); a "user" may or may not be the intended or actual end consumer of a product or service that is the subject of an advertisement, etc. In sum, persons of skill in the art will appreciate that a wide variety of actors, more than can be conveniently set forth here, can play the roles of "advertiser," "publisher," and "user" for purposes of the present invention. It will be further appreciated that the selfsame person or entity may be both "publisher" and "advertiser," or both "publisher" and "user," or both "advertiser" and "user", or even all three, depending on the context. In a similar vein, and as will be apparent from the foregoing, terms such as "web page," "website," and so forth are used to give specific illustrative examples of settings in which on-line content and advertisements can be presented to and perceived by users. Such examples are not intended to be limiting, and persons of skill in the art will appreciate that many other such settings now known or yet to be developed may be suitable to the practice of the present invention in specific embodiments.

It should be noted that although flow charts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule-based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. One or more computer-readable storage media storing computer-executable instructions that, when executed, cause one or more processors to perform acts comprising:

receiving a first request for an advertisement of an advertiser;

determining if a user associated with the first request is recognized by determining if the first request was accompanied by an identifier associated with a valid user account of the user associated with the first request;

based at least in part on determining that the user associated with the first request is recognized, examining the valid user account to determine a purchase history for the user associated with the first request;

providing an advertisement of an advertiser in response to the first request;

generating an advertising fee to be paid by the advertiser in response to a user selection of the advertisement by the user associated with the first request, the advertising fee based at least in part on the purchase history of the user associated with the first request, an amount of the advertising fee corresponding to an amount of purchase history content of the user associated with the first request, and the purchase history comprising purchases previously made by the user associated with the first request before the user selection of the advertisement;

receiving a second request for an advertisement of an advertiser;

determining if a user associated with the second request is recognized by determining if the second request was accompanied by an identifier associated with a valid user account of the user associated with the second request;

providing an advertisement of an advertiser in response to the second request; and based at least in part on determining that the user associated with the second request is not recognized, refraining from generating an advertising fee to be paid by the advertiser in response to a user selection of the advertisement by the user associated with the second request.

2. The one or more computer-readable storage media of claim 1, wherein providing the advertisement includes comparing one or more characteristics of the advertiser to the purchase history for the user in selecting the advertisement to be provided.

3. The one or more computer-readable storage media of claim 1, wherein the purchase history for the user includes past purchase information related to one or more different categories of purchases.

4. The one or more computer-readable storage media of claim 1, wherein the purchase history for the user includes past purchase information related to one or more different advertisers.

5. The one or more computer-readable storage media of claim 1, wherein the purchase history for the user includes past purchase information related to one or more specific items that were purchased.

6. The one or more computer-readable storage media of claim 1, wherein providing the advertisement includes applying one or more bids from an advertiser received based at least in part on a past purchase history correlating to the purchase history of the user and selecting the advertisement based on the one or more bids.

7. The one or more computer-readable storage media of claim 6, wherein selecting an advertisement includes determining which bid will provide a maximum revenue.

8. The one or more computer-readable storage media of claim 1, wherein determining the purchase history for the user includes receiving user information from a web publisher.

9. One or more computer-readable storage media storing computer-executable instructions that, when executed, cause one or more processors to perform acts comprising:

receiving a request for an advertisement of an advertiser;

determining if a user associated with the request is recognized by determining if the request was accompanied by an identifier associated with a valid user account of the user associated with the request;

providing an advertisement of the advertiser in response to the receiving of the request;

receiving a selection of the advertisement of the advertiser by the user;

based at least in part on determining that the user is recognized and in response to the receiving of the selection:
examining the valid user account to determine a purchase history for the user, the purchase history comprising purchases previously made by the user before the user selection of the advertisement; and
generating an advertising fee to be paid by the advertiser based at least in part on the purchase history of the user, an amount of the advertising fee proportionally corresponding to a purchase history level of the user based at least in part on the purchase history; and based at least in part on determining that the user is not recognized and in response to the receiving of the selection:
refraining from generating an advertising fee to be paid by the advertiser.

10. The one or more computer-readable storage media of claim 9, wherein the purchase history for the user includes past purchase information related to one or more different categories of purchases.

11. The one or more computer-readable storage media of claim 9, wherein the purchase history for the user includes past purchase information related to one or more different advertisers.

12. The one or more computer-readable storage media of claim 9, wherein the purchase history for the user includes past purchase information related to one or more specific items that were purchased.

13. The one or more computer-readable storage media of claim 9, wherein generating an advertising fee to be paid by the advertiser based on the purchase history of the user includes applying one or more bids from the advertiser received based at least in part on a past purchase history correlating to the purchase history of the user.

14. The one or more computer-readable storage media of claim 13, wherein selecting an advertisement includes determining which bid will provide a maximum revenue.

15. The one or more computer-readable storage media of claim 9, wherein determining the purchase history for a user includes receiving user information from a web publisher.

16. An ad placement system for on-line advertising, the ad placement system comprising one or more processors and one or more computer-readable media storing instructions that are executable on the one or more processors to:

receive advertisements from advertisers, each advertisement having an associated bid indicative of a remuneration that an advertiser associated with the advertisement will compensate a website publisher for user selection of the associated advertisement, the bid being generated based at least in part on a past purchase history correlating to a purchase history of a user;

aggregate the received advertisements in an on-line ad listing database that is accessible to website publishers via the Internet;

receive advertisement selection information and user information from a publisher of a website, the user information including the purchase history of the user if the user has been recognized with use of an identifier associated with a valid user account of the user and provided along with a request for an advertisement;

select an advertisement from the ad listing database in accordance with the selection information;

provide the advertisement to the website publisher for display on the website of the website publisher to the user; and if the user has been recognized with use of the identifier:
generate an advertising fee to be paid by an advertiser associated with the selected advertisement in response to the user selecting the advertisement, the advertising fee being based at least in part on the purchase history of the user maintained by the valid user account, an amount of the advertising fee corresponding to a purchase history tier of the user based at least in part on the purchase history, and the purchase history comprising purchases previously made by the user before the selection of the advertisement by the user;

otherwise, refrain from generating an advertising fee to be paid by an advertiser associated with the selected advertisement in response to the user selecting the advertisement.

17. The ad placement system of claim 16, wherein the ad placement system is further configured to:
receive an indication of when a visitor selects the selected advertisement on the corresponding website; and
control a flow of remuneration between the advertiser and the website publisher based on the received indication.

18. The ad placement system of claim 16, wherein the ad placement system is further configured to collect and store advertisement related data including:
advertisement identifying information;
user identifying information; and
user past purchase information.

19. The ad placement system of claim 18, wherein the ad placement system is further configured to enable publishers to navigate the ad listing database and review the stored advertisement related data.

20. The ad placement system of claim 16, wherein the ad placement system is accessible to website publishers by way of a rules engine, the rules engine being configured to store rules provided by the publishers for selection of advertisements from the ad listing database.

21. The ad placement system of claim 16, wherein the ad placement system is accessible to website publishers and further provides a control option for the website publishers to control a category of advertisements to be displayed on a respective website of each website publisher.

22. A method implemented by a computing device, comprising:
receiving, by the computing device, a request for an advertisement of an advertiser, the advertisement stored in a memory of the computing device;
providing the advertisement of an advertiser stored in the memory in response to the request for the advertisement;
determining if a user associated with the request is recognized by determining if the request was accompanied by an identifier associated with a valid user account of the user associated with the request;
if the user associated with the request for the advertisement is recognized:
examining the valid user account to determine a purchase history for the user; and
generating an advertising fee to be paid by the advertiser in response to a selection of the advertisement by the user, the advertising fee based at least in part on the purchase history of the user, an amount of the advertising fee proportional to a purchase history level of the user based at least in part on the purchase history, and the purchase history comprising purchases previously made by the user before the user selection of the advertisement; and
if the user associated with the request for the advertisement is not recognized, refraining from generating an advertising fee to be paid by the advertiser in response to the selection of the advertisement by the user.

23. A method implemented by a computing device, comprising:
receiving, by the computing device, a request for an advertisement of an advertiser, the advertisement stored in a memory of the computing device;
providing the advertisement of an advertiser stored in the memory in response to the request for the advertisement;
determining if a user associated with the request is recognized by determining if the request was accompanied by an identifier associated with a valid user account of the user associated with the request;
if the user associated with the request for the advertisement is recognized:
examining the valid user account to determine a purchase history for the user; and
generating an advertising fee of a first amount to be paid by the advertiser in response to a selection of the advertisement by the user, the first amount corresponding to the purchase history of the user and the purchase history comprising purchases previously made by the user before the user selection of the advertisement; and
if the user associated with the request for the advertisement is not recognized:
refraining from generating an advertising fee to be paid by the advertiser in response to the selection of the advertisement by the user; or
generating an advertising fee of a second amount to be paid by the advertiser in response to the selection of the advertisement by the user, the second amount being less than the first amount.

24. The one or more computer-readable storage media of claim 1, further comprising:
receiving a third request for an advertisement of an advertiser;
determining if a user associated with the third request is recognized by determining if the third request was accompanied by an identifier associated with a valid user account of the user associated with the third request;
based at least in part on determining that the user associated with the third request is recognized, examining the valid user account to determine a purchase history for the user associated with the third request;
providing an advertisement of an advertiser in response to the third request; and
generating an advertising fee to be paid by the advertiser in response to a user selection of the advertisement by the user associated with the third request, the advertising fee based at least in part on the purchase history of the user associated with the third request;
wherein the advertising fee to be paid by the advertiser in response to a user selection of the advertisement by the user associated with the third request is: (i) greater than the advertising fee to be paid by the advertiser in response to a user selection of the advertisement by the user associated with the first request if the user associated with the third request has a greater purchase history than the user associated with the first request, and (ii) less than the advertising fee to be paid by the advertiser in response to a user selection of the advertisement by the user associated with the first request if the user associated with the third request has a lesser purchase history than the user associated with the first request.

25. The one or more computer-readable storage media of claim 24, wherein a greater purchase history comprises a greater number of transactions or a greater total amount spent than a lesser purchase history.

* * * * *